Figure 1:
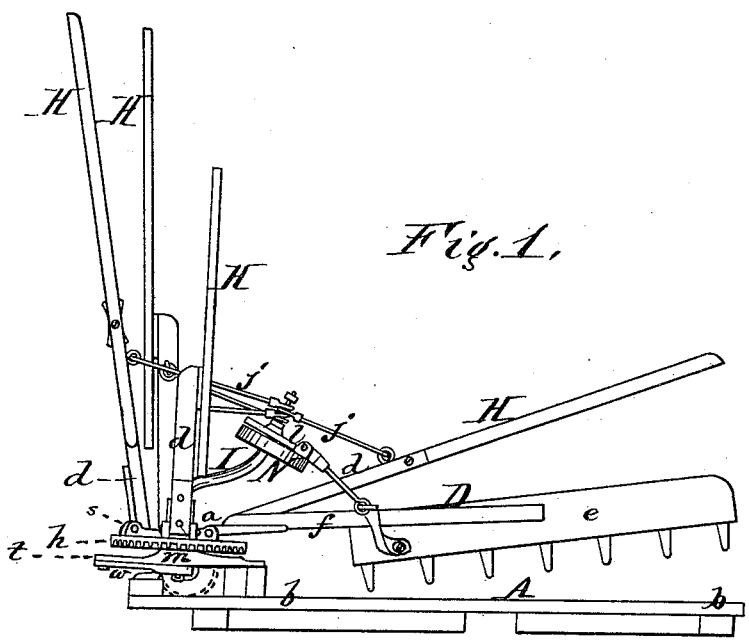

2 Sheets—Sheet 1.

E. H. CLINTON.
SELF-RAKING MECHANISM FOR REAPING-MACHINES.

No. 179,271. Patented June 27, 1876.

Witnesses
W. L. Bennem.
W. H. Isaacs.

Inventor
Edward H. Clinton
by his Atty.
C. S. Kenwick.

2 Sheets—Sheet 2.
E. H. CLINTON.
SELF-RAKING MECHANISM FOR REAPING-MACHINES.
No. 179,271. Patented June 27, 1876.
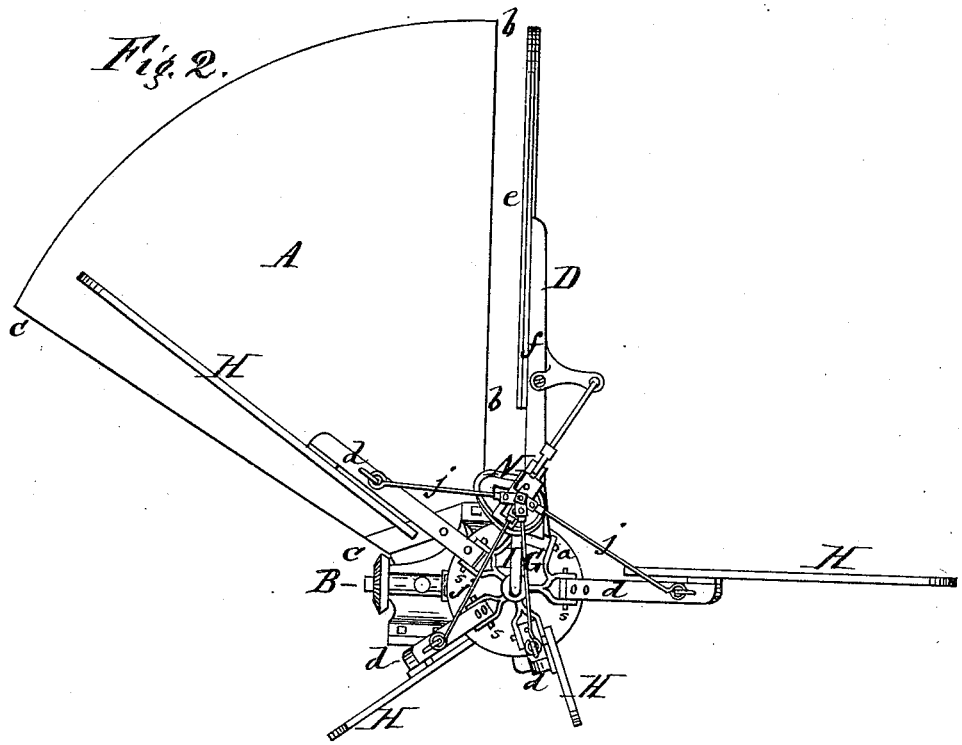
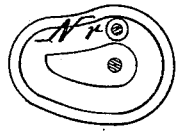
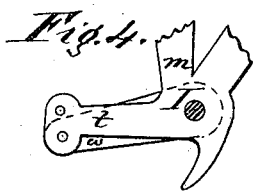
Witnesses
W. L. Bennent
W. H. Isaacs.
Inventor
Edward H. Clinton
by his atty.
E. S. Renwick

UNITED STATES PATENT OFFICE.

EDWARD H. CLINTON, OF IOWA CITY, IOWA, ASSIGNOR TO WILLIAM A. KNOWLTON, OF ROCKFORD, ILLINOIS.

IMPROVEMENT IN SELF-RAKING MECHANISMS FOR REAPING-MACHINES.

Specification forming part of Letters Patent No. 179,271, dated June 27, 1876; application filed November 17, 1874.

*To all whom it may concern:*

Be it known that I, EDWARD H. CLINTON, of Iowa City, in the county of Johnson and State of Iowa, have made an invention of certain new and useful Improvements in Self-Raking Mechanism for Reaping-Machines; and that the following is a full, clear, and exact description and specification of the same.

The objects of this invention are to compel a sweep-rake and a series of reel-ribs to pursue their proper paths when carried around by a revolving carrier, and also to enable these paths to be varied according to the work to be done. To these ends my invention consists of certain combinations of mechanical devices, which are specified in detail at the close of this specification.

In order that these improvements may be fully understood I have represented in the accompanying drawing, and will proceed to describe, certain portions of a harvesting-machine, embodying them in the best form known to me at the present date, with the understanding that the same may be modified as circumstances render expedient.

In the said drawings, Figure 1 represents a front elevation of a raking-platform, and the raking and gathering mechanism. Fig. 2 represents a plan of the same. Figs. 3 and 4 represent detached parts of the mechanism drawn upon a larger scale than the other figures.

The raking-platform A, represented in said drawings, is adapted to the employment of a radial sweep-rake, being quadrantal in form, and being connected with the frame of the machine, so that its front edge *b b* corresponds with the line of the cutting mechanism or thereabout, and that its rear edge *c c* is in the proper position for the delivery of grain behind the horses by a sweep-rake, as is well understood by builders of reaping-machines. This platform should be fitted with fenders at its inner and outer sides, to guide the grain in the usual manner, as is common with sweep-rake reapers.

The rake D is a radial sweep-rake, and its rake-head *e* is connected, by a radial arm, *f*, with the revolving carrier G, by means of a pivot, *a*, which permits the rake to rise and descend as it is carried around by the revolving driver G. The reel-ribs H H in the present example are four in number. Each is a radial rib, being connected by an arm, *d*, with the same revolving carrier G that carries the rake D. This carrier has the form of a crown-wheel with cog-teeth *h* at its under side, and these teeth engage with those of a pinion on the shaft B, to which a suitable revolving movement is imparted by connecting it with one of the running wheels of the machine. As the construction and arrangement of such connecting mechanism are well understood by the constructors of reaping-machines, it is not deemed necessary to describe them in detail. The connection of the arms of the reel-ribs with the revolving carrier G is by means of pivots *s*, which permit the ribs to be turned up and down as they are carried around by the revolving carrier G. In order that the reel-ribs may be forced to descend as they approach the front edge *b b* of the platform, (at which the guard-fingers and cutters operate,) and to rise after passing that side, each reel-arm *d* is connected, by a rod, *j*, with the upper end or wrist of a fixed crank-standard, I, the lower part of which forms the axial for the revolving carrier G. The connection of each rod *j* with this standard is by a stub end, which turns freely upon the said standard. This crank-standard is fixed securely in its place, so that it does not move during the operation of the machine; but as it is of crank form, so that its upper end is at one side of the center of the revolving carrier G, which turning upon its lower portion, the reel-ribs are caused to oscillate on their pivots as they are carried around by the carrier G, and thus to descend and rise as required.

In order that the radial rake may be caused to descend as it approaches the front side of the platform to sweep over it with its teeth engaged in the grain lying thereon, and to rise from its rear side *c c*, the rake-arm *f* is connected with the fixed crank-standard I by means of a rod, *g*; and the connection is effected through the intervention of a slotted slide, *l*, which embraces the crank-standard, and of the cam N, which operates upon a friction-wheel, *r*, pivoted to the said slide. The form of the cam N is such that the radial rake is held down to the platform while sweeping over it, but caused to rise from its rear edge c c, and to assume a posture corresponding substantially with that of one of the reel-arms in passing around to and descending toward the front edge b b of the platform.

In order that the paths pursued by the reel-ribs and rake may be varied as found expedient, the crank-standard I, although fixed when in use, is constructed to turn in the bracket m that connects it with the residue of the machine, and it is fitted beneath said bracket with an arm, w. The end of this arm is connected with a corresponding arm, t, projecting from the bracket m, by means of a screw-bolt; and several holes for said bolt are made in the end of the bracket-arm t. Hence, when the said bolt is removed, the crank-standard may be turned in its bearing in the bracket, so as to place its upper end or wrist forward or backward, for the purpose of varying the line to which the reel-ribs and rake-head descend relatively to the platform and cutters, as required in practice; and then the standard may be fixed in its new position by replacing the bolt.

The arms and bolt thus described constitute adjustable securing mechanism for enabling the crank-standard and the cam to be readily adjuited to and secured in different positions; and as this adjustable securing mechanism is arranged below the revolving carrier G, ample space is afforded for making it of the requisite strength and rigidity. Adjustable securing mechanisms of other forms may, of course, be substituted in place of the arms and bolt above described, such substituted mechanism being arranged below the revolving carrier G.

It is an essential feature of my invention that the crank-standard does not oscillate or vibrate transversely of its length, as movement of this description would modify the action of the reel-ribs, and would be injurious to their operation. It is also an essential feature of my invention that the rake is not held always at a fixed distance from the wrist of the crank-standard, but that it is moved relatively to that wrist by the action of a cam, or some substitute thereof, so that the rake-teeth may sweep close to the platform, notwithstanding the combination of the rake with the wrist of a fixed crank-standard that compels the reel-ribs to rise from the platform soon after passing its front edge.

Portions of my invention may be used without others. Thus, for example, the reel-ribs may be operated by the means described, while the rake, although carried around the standard, may be controlled by a cam without being connected with the wrist of the standard.

I claim as my invention—

1. The combination, substantially as before set forth, of the radial rake, the revolving carrier, the fixed crank-standard, the reciprocating slide, and the cam for moving the rake relatively to the wrist of the fixed crank-standard.

2. The arrangement, substantially as before set forth, of the radial reel-rib, the radial rake, the revolving carrier, the reciprocating slide for the rake, and the cam, in connection with one fixed crank-standard.

3. The combination, substantially as before set forth, of the fixed crank-standard and the rake-cam, with the adjusting arms and bolt, which are arranged below the revolving carrier, that revolves upon said standard, and which enable said cam and standard to be secured in different positions.

Witness my hand this 6th day of November, A. D. 1874.

EDWARD H. CLINTON.

Witnesses:
H. O. HUTCHINSON,
F. F. CUBEA.